(12) United States Patent
Gleichauf et al.

(10) Patent No.: US 7,710,869 B1
(45) Date of Patent: *May 4, 2010

(54) PACKET ROUTING TO REDUCE SUSCEPTIBILITY TO DISTURBANCES

(75) Inventors: Robert E. Gleichauf, San Antonio, TX (US); Shmuel Shaffer, Palo Alto, CA (US); Robert T. Bell, Bountiful, UT (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 974 days.

This patent is subject to a terminal disclaimer.

(21) Appl. No.: 11/230,799

(22) Filed: Sep. 19, 2005

Related U.S. Application Data

(63) Continuation of application No. 09/825,662, filed on Apr. 3, 2001, now Pat. No. 6,947,379.

(51) Int. Cl.
*H04L 12/56* (2006.01)

(52) U.S. Cl. .................. 370/229; 370/356; 370/536

(58) Field of Classification Search ............... 370/356, 370/536, 394, 400, 473, 229
See application file for complete search history.

(56) References Cited

U.S. PATENT DOCUMENTS

| | | | | |
|---|---|---|---|---|
| 5,610,945 | A * | 3/1997 | Gregg et al. | 375/260 |
| 6,002,670 | A | 12/1999 | Rahman et al. | 370/238 |
| 6,122,743 | A | 9/2000 | Shaffer et al. | 713/201 |
| 6,222,858 | B1 | 4/2001 | Counterman | 370/474 |
| 6,496,477 | B1 | 12/2002 | Perkins et al. | 370/228 |
| 6,574,191 | B1 | 6/2003 | Usukura et al. | 370/216 |
| 6,577,653 | B1 | 6/2003 | Rochberger et al. | 370/536 |
| 6,587,431 | B1 | 7/2003 | Almulhem et al. | 370/229 |
| 6,680,954 | B1 * | 1/2004 | Cam et al. | 370/474 |
| 6,751,746 | B1 | 6/2004 | Jain et al. | 714/4 |
| 6,775,257 | B1 | 8/2004 | Watanabe | 370/335 |
| 6,788,686 | B1 | 9/2004 | Khotimsky et al. | 370/394 |
| 6,834,044 | B2 * | 12/2004 | Sugirtharaj et al. | 370/328 |

* cited by examiner

*Primary Examiner*—Min Jung
(74) *Attorney, Agent, or Firm*—Baker Botts L.L.P.

(57) ABSTRACT

In a communications system, a network provides multiple physical paths for communicating packets between participants of communication sessions. During a communication session, elements of the network route packets such that the packets are separated for communication to a destination using multiple physical paths.

14 Claims, 3 Drawing Sheets

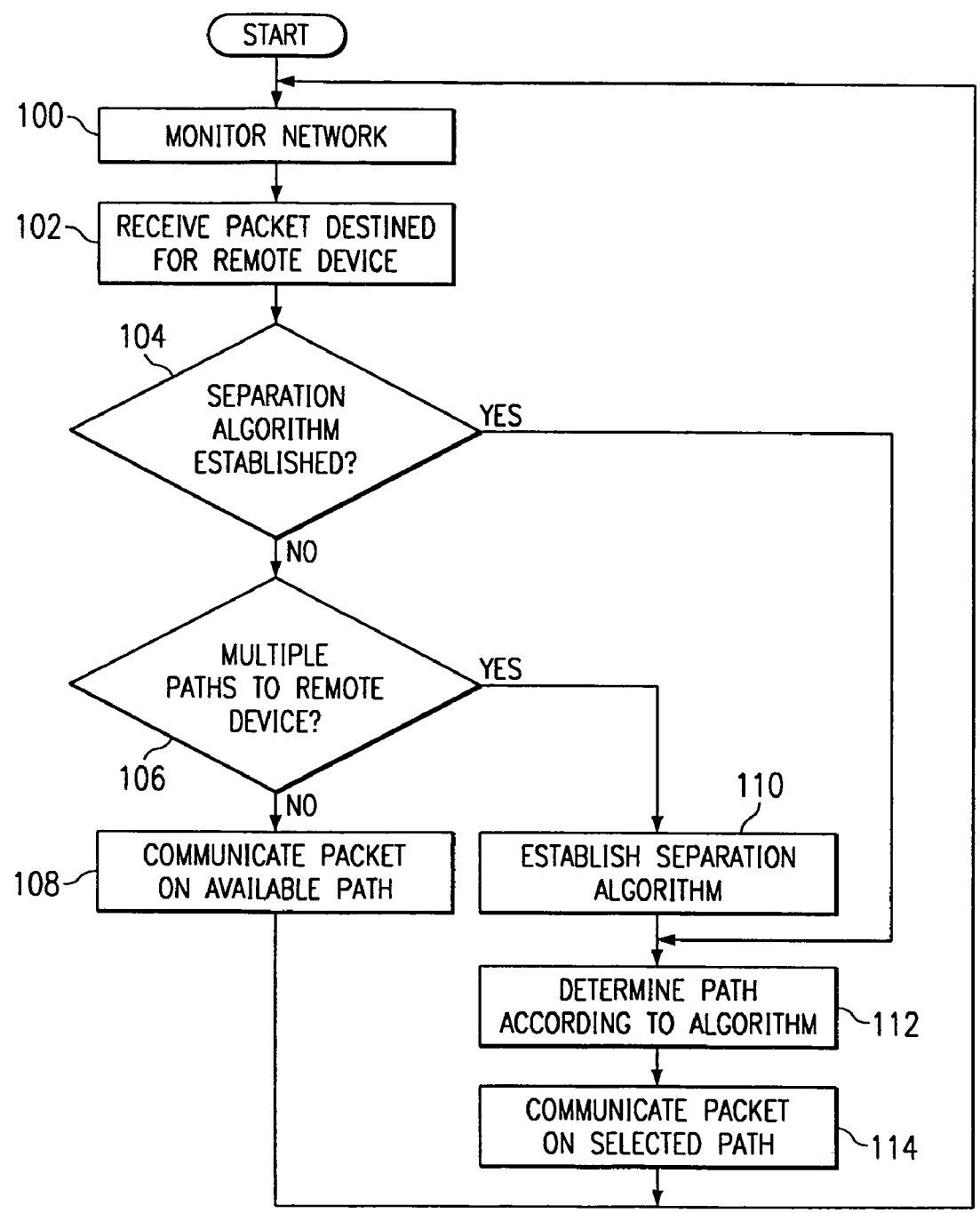

US 7,710,869 B1

PACKET ROUTING TO REDUCE SUSCEPTIBILITY TO DISTURBANCES

CROSS REFERENCE TO RELATED APPLICATIONS

This application is a continuation of U.S. patent application Ser. No. 09/825,662 filed Apr. 3, 2001 now U.S. Pat. No. 6,947,379 and entitled "Packet Routing to Reduce Susceptibility to Disturbances".

TECHNICAL FIELD OF THE INVENTION

The present invention relates generally to packet-based communications and more particularly to packet routing to reduce susceptibility to disturbances.

BACKGROUND OF THE INVENTION

To deliver high bandwidth low cost communications solutions, many organizations and individuals use packet-based communications systems. These systems may support various types of communications, including the communication of streaming data such as voice or video. However, a major impediment towards widespread acceptance of packet-based communications is a perceived susceptibility of these systems to interferences that cause packet loss. For example, during a voice over IP (VoIP) communication session, transient or chronic disturbances can significantly impact perceived quality of the communications.

SUMMARY OF THE INVENTION

In accordance with the present invention, techniques for packet routing to reduce susceptibility to disturbances are provide that substantially eliminate or reduce disadvantages and problems associated with previous techniques. In a particular embodiment, the present invention satisfies a need for a system that separates packets associated with a communication session among multiple available routes to reduce perceptible quality degradations caused by disturbances in only some of the routes. For example, a router in a communications system may receive a stream of packets for a communication session, determine multiple paths to deliver the packets to a recipient, separate the packets into multiple streams, and communicate each of the streams to the recipient along a separate path.

In accordance with one embodiment of the present invention, a method for communicating packets to a remote device receives packets encoding streaming data for delivery to a remote device, with each of the packets including a sequence number. The method separates the packets into streams corresponding to multiple paths to the remote device, with each of the streams including a subset of the packets having no more than a predetermined number of consecutive sequence numbers. The method then communicates the streams using the corresponding paths to reduce susceptibility to a disturbance on one of the paths.

In accordance with another embodiment of the present invention, a network node includes a network interface that couples to multiple paths to a remote device. The network interface receives packets encoding streaming data for delivery to the remote device, with each of the packets including a sequence number. The network node also includes a processor that separates the packets into streams corresponding to the paths, with each of the streams including a subset of the packets having no more than a predetermined number of consecutive sequence numbers. The network interface of the network node communicates these streams on the corresponding paths to reduce susceptibility to disturbance on one of the paths.

Various embodiments of the present invention provide a number of technical advantages. Using these techniques, a system may provide relatively reliable packet-based communications even when disturbances affect selected routes between communications devices. By communicating streaming data over a number of separate paths, a disturbance or disturbances along one of these paths affects only a limited number of the packets associated with the communication session. When the streams are intelligently distributed among available paths, a system may reduce or eliminate susceptibility to quality degradation due to disturbances on one of the paths. For example, a device in the system, after identifying multiple paths to a recipient, may alternate between the paths to communicate each subsequent packet using a different path than the previous packet. This substantially reduces the probability of sequential packet loss since a disturbance on one of the paths will not result in the loss of sequential packets. This increases the recoverability of received packet communications, since the data from lost of damaged packets may be recovered or estimated using techniques such as interpolation or extrapolation. Moreover, the loss of non-sequential packets affects perceived quality less than the loss of a block of sequential packets.

Other technical advantages of the present invention will be readily apparent to one skilled in the art from the following figures, descriptions, and claims.

BRIEF DESCRIPTION OF THE DRAWINGS

FIG. 4 is a flowchart of a method for distributing packets associated with a communication session for communication using multiple routes to a destination.

DETAILED DESCRIPTION OF THE DRAWINGS

Figure 1:
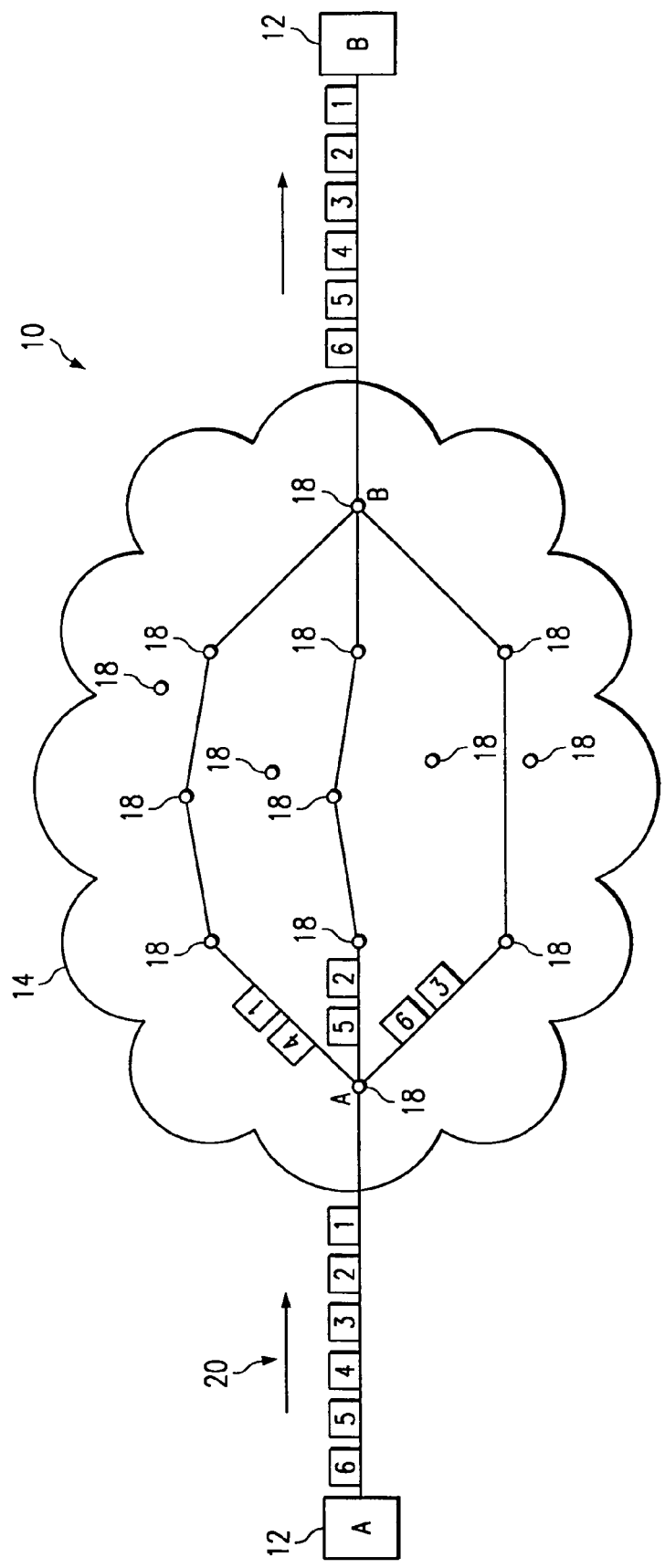
FIG. 1 illustrates a communications system implementing packet routing according to the present invention.

FIG. 1 illustrates a communications system, indicated generally at 10, that includes communications devices 12 coupled using a communications network 14. Within network 14, routers 18 direct packets along various physical routes to support packet-based communications, such as communication sessions between device 12 labeled A (Device A) and device 12 labeled B (Device B). In general, devices 12 establish packet-based, connectionless communication sessions using network 14. Through the operation of devices 12 and/or routers 18, network 14 routes various packets associated with a communication session along different physical paths. For example, a selected router 18 may separate packets associated with a communication session into multiple streams and communicate each stream to a destination using different physical paths.

Devices 12 represent communications equipment, including hardware and/or software, capable of supporting packet-based communications. For example, devices 12 may represent personal computers, internet protocol (IP) telephones, wireless communications devices, or any other suitable communications equipment. Devices 12 couple to network 14 via one or more wireless or wireline links. Thus, devices 12 may couple to multiple components of network 14 and, using these multiple available links, may distribute packets of a communication session for communication to a remote destination using different links corresponding to different physical paths. Alternatively or in addition, devices may establish virtual paths using any suitable routing protocols, with each virtual path corresponding to a different physical path through network 14. Thus, even when connected to network 14 using a single link, a selected device 12 may establish multiple physical paths for communicating packets to a destination.

Network 14 represents any suitable collection and arrangement of communications equipment supporting transport and delivery of packets. For example, network 14 may be one or a collection of components associated with the public switched telephone network (PSTN), local area networks (LANs), wide area networks (WANs), a global computer network such as the internet, or any other communications equipment suitable for providing wireless and/or wireline communications. In the embodiment illustrated, network 14 includes routers 18, which link using any suitable physical transmission media and/or communications equipment to form a mesh supporting packet-based communications between devices 12.

Thus, routers 18 represent communications equipment, including hardware and/or software, operable to receive, route, and transmit packets. In addition, selected routers 18 may provide intelligent routing of packets associated with individual communication sessions to potentially enhance reliability and reduce susceptibility of the sessions to various disturbances. These disturbances represent conditions that potentially affect quality as perceived by recipients, such as interference or other communications failures resulting in packet corruption or packet loss, and also represent malicious and/or deliberate acts by third parties, such as "snooping" on a packet-based communication session.

In operation, devices 12 establish packet-based communication sessions and communicate information to each other using network 14. According to a particular embodiment, selected routers 18 in network 14 operate to separate packets associated with the communication session into multiple streams for delivery to recipients using various physical paths. Consider the example provided by the embodiment illustrated. In this example, Device A and Device B have established a packet-based communication session through links with network 14. Device A couples to router 18 labeled A (Router A) while Device B couples to router 18 labeled B (Router B). During setup of the communication session or at any other appropriate time, Router A determines available physical paths for delivering packets from Device A to Device B. Router A may select some or all of these paths for use in communicating selected packets from Device A to Device B.

In setting up a communication session for delivery of packets along multiple paths, Router A may use any suitable techniques for selecting paths and determining an appropriate separation algorithm for allocating various packets among selected communications paths. In a particular embodiment, routers 18 may identify reliable, high-speed routes for communicating time-sensitive packets and determine slower-speed routes for communicating non-time-critical packets. For example, Router A may communicate streaming data, such as voice information, on available high-speed routes while communicating signaling information for the communication session on slower routes. However, routers 18 may use any suitable characteristics and/or information for available paths to select appropriate paths and determine an algorithm for separating packets of a communication session among the selected paths. For example, routers 18 may monitor congestion along paths, packet delay or packet losses associated with paths, and other appropriate metrics for identifying and selecting suitable paths. Moreover, routers 18 may monitor characteristics of various available paths and selected paths during a communication session and, in response to changes in these values, modify path selections and/or modify algorithms for distributing packets among selected paths. Thus, a separation algorithm may dynamically adapt to changing network conditions.

During the communication session between Device A and Device B, Device A may communicate packets for delivery to Device B. In the example, as illustrated at 20, Device A communicates a stream of packets, labeled one through six, to Router A for delivery to Device B. Upon receiving each packet, Router A determines an appropriate path for delivering the received packet to Device B and routes the packet on this path. In the example illustrated, Router A implements an algorithm in which sequential packets are communicated down alternating routes. Thus, using three available routes, Router A communicates the first packet down a first path, the second packet down a second path, and the third packet down a third path. Router A then communicates the fourth packet down the first path, the fifth packet down the second path, and the sixth packet down the third path. This separation algorithm significantly reduces the probability of sequential packet loss since disturbance on a single path will affect only every third packet. This can drastically improve the ability of receiving devices to recover communications through techniques such as digital signal processing. Therefore, in certain circumstances, separation algorithms may drastically improve perceived quality by the recipient even given disturbances in network 14 that result in packet loss and/or degradation.

However, while the example illustrated provides a specific method for separating packets among available paths, system 10 contemplates devices 12 and/or routers 18 using any appropriate techniques for distributing packets among available paths. For example, given some predetermined number of sequential packets that may be lost without significantly affecting perceived quality, devices 12 and/or routers 18 may attempt to assure that no more than this predetermined number of sequential packets are communicated along the same physical path. Thus, if no more than two sequential packets may be lost before significantly affecting perceived quality, device 12 and/or routers 18 may attempt to insure that no more than two sequential packets propagate along the same physical path.

In addition, while the example illustrated demonstrates a particular router 18 implementing path selection and routing of packets along the selected paths, system 10 contemplates devices 12, routers 18, and/or other appropriate communications equipment identifying and selecting available paths and determining appropriate separation algorithms for distributing packets among available paths. Moreover, while this example focuses only on communications from Device A to Device B, packets from Device B to Device A may be similarly split among selected paths. For example, Router B may select identical or alternate paths as selected by Router A for communicating packets from Device B to Device A. Thus, elements may act independently in selecting paths and developing separation algorithms. Moreover, each separate stream of packets may be further divided for communication on multiple available routes, resulting in packets branching out through network 14 yet still being delivered to a single recipient.

According to particular embodiments, routers 18 communicate to form logical communication paths for each separate stream of packets for a communication session. Using the logical paths, routers 18 monitor network performance along the multiple paths used for delivering packets. For example, in the embodiment illustrated, router A communicates packets for the communication session along three separate paths to router B. Thus, router A and router B establish three logical communication paths to track the operation of each separate path. This permits router A and router B to determine, for example, which packets are successfully communicated along each path and determine when packets along one of the paths are lost. Therefore, routers A and B can detect and respond to chronic disturbances along one or more of the paths selected for delivering packets.

Figure 2:
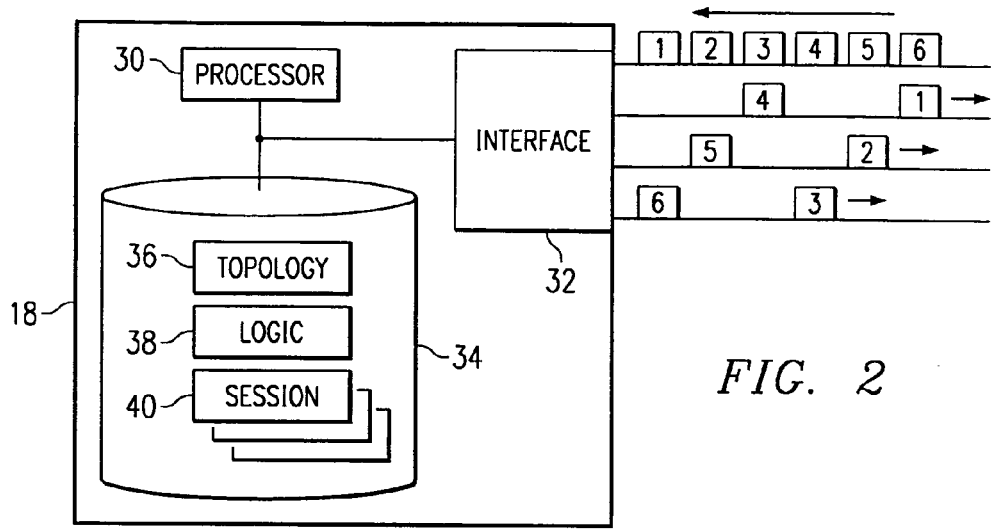
FIG. 2 is a block diagram illustrating a router from the system that routes packets of a communication session among multiple available routes.

FIG. 2 is a block diagram illustrating functional components of an exemplary router 18 that include a processor 30, an interface 32, and a memory 34. Interface 32 couples router 18 to other communications equipment, such as other routers 18, devices 12, and other elements of network 14. More specifically, router 18 may identify available physical paths for delivering packets associated with a communication session to a destination, develop or access an algorithm for separating received packets among the paths, and then communicate packets for the session using some or all of the available paths.

Memory 34 supports the operation of elements within router 18 by maintaining information in long or short term storage. Thus, memory 34 represents any collection and arrangement of volatile or non-volatile, local or remote devices suitable for storing data, for example, random access memory (RAM) devices, read only memory (ROM) devices, magnetic storage devices, optical storage devices, or any other suitable data storage devices. In the embodiment illustrated, memory 34 stores topological information 36, logic 38, and session information 40. Topological information 36 represents information for identifying, selecting, and routing among various paths through network 14. For example, topological information 36 may include a topology of elements in network 14, addressing information, performance information for various links in network 14, characteristics of various links, and other appropriate information for describing the availability and accessibility of elements in and attached to network 14. Router 18 may periodically or sporadically refresh some or all of topological information 36 and use the changing information to dynamically adjust selected paths and separation algorithms for communication sessions.

To control operation of elements of router 18, process and analyze topological information 36 and session information 40, and perform other suitable processing, memory 34 includes logic 38. Logic 38 represents algorithms, software, code and/or other appropriate modules for use by router 18. For example, logic 38 may include programs for execution by processor 30 to analyze topological information 36 and identify and select from available paths for communicating packets to destinations. In addition, logic 38 may include separation algorithms for statically and/or dynamically determining appropriate distribution of packets among available communications paths.

Session data 40 includes information describing communication sessions established by devices 12. Router 18 uses session data 40 for distributing packets associated with each session among available paths. For example, upon device 12 establishing a communication session passing through router 18, router 18 may generate session data 40 for that session. These data may include information such as addresses of participants, available paths, selected paths, algorithms for use in distributing packets among selected paths, current sequence numbers of the session, and other suitable information for use by router 18 in communicating packets associated with the session using multiple available paths.

Interface 32 provides multiple links to other elements of network 14 and to devices 12. These links represent physical and/or virtual communications paths for communicating information to remote communications equipment. Using these links, router 18 receives packets associated with communication sessions and routes the packets for each communication session for delivery to a remote destination using multiple physical paths. To coordinate operation of its various elements, router 18 includes processor 30. Processor 30 represents any one or collection of microprocessors, controllers, or other suitable logic devices. For example, processor 30 may represent a microprocessor or group of microprocessors executing instructions stored by memory 34.

In operation, router 18 receives packets associated with communication sessions of devices 12 and, for each communication session, separates packets into various streams for communication to a destination using different physical paths. As previously discussed, router 18 may use any suitable algorithm for separating and communicating packets. These algorithms may separate packets based on header information such as sequence numbers, arrival times, contents of the packets, network characteristics such as congestion, capacity, and historical data on network performance, and/or any other suitable information and criteria. For example, during a communication session, a particular device 12 may stream data encoded in packets for delivery to a destination. While receiving the packets, router 18 separates the packets into multiple streams and communicates each stream on a separate path to the destination.

Consider the example illustrated by the embodiment of router 18 having an interface 32 with multiple available paths. Using a first path, interface 32 receives packets one through six for routing to a destination. In the embodiment illustrated, router 18 communicates each subsequent packet using a different available route corresponding to a different physical path to reach the destination. Thus, router 18 communicates packet one using a first available route to reach the destination, packet two using a second available route, and packet three using a third available route. After exhausting all selected paths, router 18 returns to the first available path. Thus, router 18 communicates packet four using the first available route, packet five using the second route, and packet six using the third route. However, while this example illustrates a specific embodiment of router 18 implementing a particular separation algorithm, system 10 contemplates routers 18 and/or devices 12 using any suitable techniques and algorithms for communicating packets associated with a communication session for delivery to a destination via different physical paths. Thus, while the preceding example focuses on the operation of router 18 in receiving and separating streams of packets, system 10 contemplates device 12 performing some or all of the functions described for router 18 in determining available paths, selecting particular paths, and communicating packets for delivery to a remote destination by separating the packets among the selected paths.

Moreover, while this example includes specific functional elements for router 18, system 10 contemplates router 18 containing any collection and arrangement of suitable elements. Thus, while the embodiment illustrates specific functional elements, router 18 may include other elements providing various functions for receiving, processing, and communicating packets. In addition, system 10 contemplates implementing each of the functional elements within router 18 using any appropriate combination and arrangement of hardware and/or software and implementing any of the functionalities using logic encoded in a storage medium, such as a computer program maintained in a computer-readable data storage medium.

Figure 3:
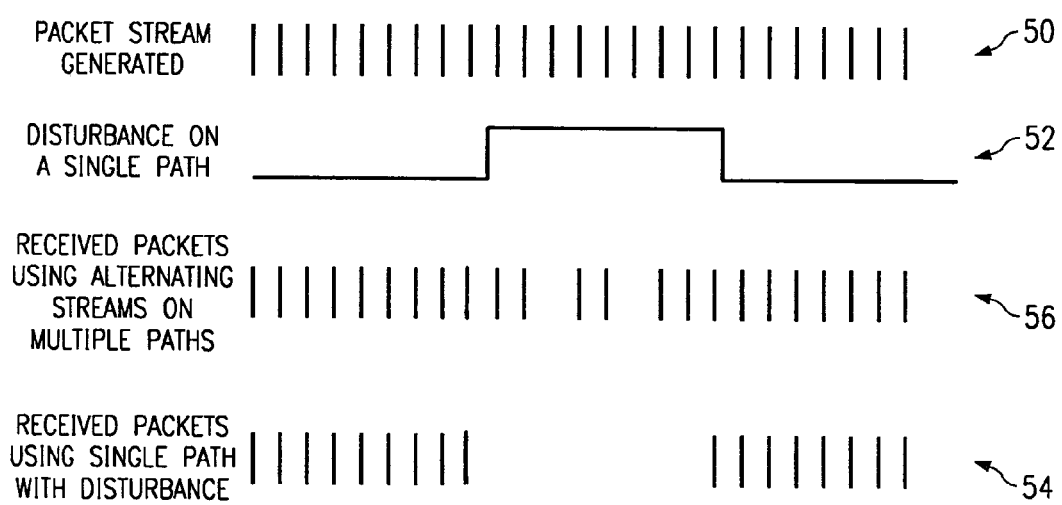
FIG. 3 is a timing diagram illustrating advantages of a particular packet routing algorithm using multiple routes as compared to a single-route communications scheme.

FIG. 3 is a timing diagram illustrating benefits of communicating packets associated with a communication session along multiple physical paths as compared to techniques using only a single path for the communication of packets. This illustration includes a representation of a stream of packets generated by device 12, as indicated at 50, for delivery to a remote destination. In this example, network 14 provides multiple available physical paths for communicating these packets from device 12 to the remote destination. Along one of these paths, a disturbance, indicated at 52, operates to disrupt any packets traveling along this path. Thus, a system communicating packets for a communication session along the path affected by disturbance 52 will experience total packet loss during disturbance 52. Thus, as indicated at 54, the destination address receives a series of packets missing a large sequential block of data. During a communication session involving streaming data, such as voice communications, this loss of a block of sequential packets may result in serious, perceptible quality degradations.

By communicating packets of the communication session on multiple physical paths, disturbance 52 along a single path results in a far less significant impact upon received packets. For example, in a voice communication session, digital signal processing resources at the endpoints can process received packets to compensate for packets lost, thus minimizing the perceived degradations of voice quality. This illustration assumes that packets for the communication session are alternated along three available physical paths, with only a single one of these paths affected by disturbance 52. Thus, the destination address receives a larger percentage of the communicated packets, as indicated at 56, given disturbance 52 along one of the paths in use. Moreover, as is apparent by this illustration, packet loss may be limited to non-sequential packets, thus preventing the loss of blocks of sequential data. In certain circumstances, the amount and distribution of packets received by a destination address, even given disturbances along selected paths, may provide sufficient information to significantly or completely alleviate quality degradations. Moreover, the non-sequential nature of packet loss resulting from these packet separation techniques enables more effective and efficient recovery of lost data using techniques such as interpolation or extrapolation.

While the preceding diagram provides a particular example of the effects of a disturbance on received packets, the example is provided merely for illustrative purposes and, as previously discussed, system 10 contemplates using any suitable techniques and algorithms for separating packets among multiple available communications routes.

FIG. 4 is a flow-chart illustrating a method for separating packets associated with a communication session and communicating the separated packets using multiple available physical paths. Router 18 monitors network 14 at step 100 for packets and may also monitor characteristics of network 14, such as congestion, and store these characteristics as topological information 36. Router 18 receives a packet destined for a remote device at step 102 and determines whether a separation algorithm has been established for routing the received packet at step 104. For example, by determining identifying information indicated by a header of the packet, router 18 may access session data 40 to determine whether a separation algorithm has been established for the communication session. If so, router 18 determines a path according to the algorithm at step 112 and communicates the packet on the selected path at step 114.

However, if router 18 determines that a separation algorithm has yet to be established for this communication session, router 18 may determine whether network 14 provides multiple paths to the remote device at step 106. If not, router 18 communicates the packet on the one available path at step 108. However, if router 18 identifies multiple paths to the remote device, router 18 may establish a separation algorithm at step 110. For example, router 18 may determine a particular algorithm maintained by logic 38 for use in separating received packets among multiple paths to the remote device. In addition, router 18 may also establish session data 40 for the communication session associated with the packet. This permits router 18 to process future received packets of the communication session using the predetermined session data 40. Upon establishing a separation algorithm, router 18 determines a path according to the algorithm at step 112 and communicates the packet on the selected path at step 114. Therefore, using these techniques, router 18 may process received packets such that network 14 transports packets associated with a communication session to destinations using multiple available physical paths.

While this flow-chart illustrates an exemplary method of operation, system 10 contemplates routers 18 using any suitable techniques for communicating packets associated with a communication session using multiple available routes. Thus, many of the steps in this flow-chart may take place simultaneously and/or in different orders than is shown. In addition, system 10 contemplates any suitable distribution or separation of setup and management of session data 40 and separation algorithms. For example, device 12 may establish a separation algorithm and select from the available paths, while router 18 implements the selected algorithm. Furthermore, system 10 contemplates routers 18 using methods with additional steps, fewer steps, and/or different steps, so long as the methods remain appropriate for communicating packets associated with a communication session using multiple available physical paths.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A computer-implemented method executable using one or more processors for communicating packets to a remote device comprising:

determining at a processor a number of sequential packets that may be lost without significantly affecting perceived voice quality of a communication session;

receiving at an interface a plurality of packets for delivery to one or more remote destination devices, wherein each of the packets comprises a sequence number;

determining, at a network processor, for each of the plurality of packets based on header identification information in the packet whether the packet is a part of a communication session for which a separation algorithm has been established;

for each packet for which it is determined that the packet is not part of a communication session for which a separation algorithm has been established, communicating, at a router, the packet to its remote destination device on an available path; and for each packet for which it is determined that the packet is part of a communication session for which a separation algorithm has been established:
  determining a path for the packet to its remote destination device out of a plurality of possible paths to the remote destination device to ensure that none of the plurality of paths to the remote destination device carry more than the determined number of sequential packets that are part of the communication session of the packet; and
  communicating, at the router, the packet to its remote destination device along the determined path for the packet.

2. The method of claim 1, wherein the communication session comprises voice information.

3. The method of claim 1, wherein the separation algorithm comprises alternating between the possible paths to the remote destination device to ensure that none of the plurality of paths to the remote destination device carry more than the determined number of sequential packets.

4. The method of claim 1, further comprising:
determining a capacity for each of the possible paths; and
wherein the separation algorithm comprises separating packets that are part of the communication session based on the capacities of the possible paths.

5. A system, comprising:
a processor operable to determine a number of sequential packets that may be lost without significantly affecting perceived voice quality of a communication session;
a network interface operable to receive a plurality of packets for delivery to one or more remote destination devices, with each of the packets comprising a sequence number;
a processor operable to:
  determine for each of the plurality of packets based on header identification information in the packet whether the packet is a part of a communication session for which a separation algorithm has been established;
  for each packet for which it is determined that the packet is not part of a communication session for which a separation algorithm has been established, communicate using the network interface the packet to its remote destination device on an available path; and
  for each packet for which it is determined that the packet is part of a communication session for which a separation algorithm has been established:
    determine a path for the packet to its remote destination device out of a plurality of possible paths to the remote destination device to ensure that none of the plurality of paths to the remote destination device carry more than the determined number of sequential packets that are part of the communication session of the packet; and
    communicate using the network interface the packet to its remote destination device along the determined path for the packet.

6. The system of claim 5, wherein the communication session comprises voice information.

7. The system of claim 5, wherein the processor is further operable to, based on the separation algorithm, alternate between the possible paths to the remote destination device to ensure that none of the plurality of paths to the remote destination device carry more than the determined number of sequential packets.

8. The network node of claim 5, wherein the processor is further operable to:
determine capacity for each of the possible paths; and
based on the separation algorithm, separate packets that are part of the communication session based on the capacities of the possible paths.

9. Logic for communicating packets to a remote device, the logic encoded in a computer readable storage medium and operable when executed by a processor to:
determine a number of sequential packets that may be lost without significantly affecting perceived voice quality of a communication session;
receiving a plurality of packets for delivery to one or more remote destination devices, wherein each of the packets comprises a sequence number;
determine, for each of the plurality of packets based on header identification information in the packet whether the packet is a part of a communication session for which a separation algorithm has been established;
for each packet for which it is determined that the packet is not part of a communication session for which a separation algorithm has been established, communicate the packet to its remote destination device on an available path; and
for each packet for which it is determined that the packet is part of a communication session for which a separation algorithm has been established:
  determine a path for the packet to its remote destination device out of a plurality of possible paths to the remote destination device to ensure that none of the plurality of paths to the remote destination device carry more than the determined number of sequential packets that are part of the communication session of the packet; and
  communicate the packet to its remote destination device along the determined path for the packet.

10. The logic of claim 9, further operable to alternate between the possible paths to the remote destination device to ensure that none of the plurality of paths to the remote destination device carry more than the determined number of sequential packets.

11. The logic of claim 9, further operable to:
determine a capacity for each of the possible paths; and
separate packets that are part of the communication session based on the capacities of the possible paths.

12. A network node comprising:
means for determining a number of sequential packets that may be lost without significantly affecting perceived voice quality of a communication session;
means for receiving a plurality of packets for delivery to one or more remote destination devices, wherein each of the packets comprises a sequence number;
means for determining for each of the plurality of packets based on header identification information in the packet whether the packet is a part of a communication session for which a separation algorithm has been established;
for each packet for which it is determined that the packet is not part of a communication session for which a separation algorithm has been established, means for communicating the packet to its remote destination device on an available path; and
for each packet for which it is determined that the packet is part of a communication session for which a separation algorithm has been established:

means for determining a path for the packet to its remote destination device out of a plurality of possible paths to the remote destination device to ensure that none of the plurality of paths to the remote destination device carry more than the determined number of sequential packets that are part of the communication session of the packet; and means for communicating the packet to its remote destination device along the determined path for the packet.

13. The network node of claim 12, wherein the means for determining a path for the packet to its remote destination device comprises means for alternating between the possible paths to the remote destination device to ensure that none of the plurality of paths to the remote destination device carry more than the determined number of sequential packets.

14. The network node of claim 12, further comprising:

means for determining a capacity for each of the possible paths; and means for separating packets that are part of the communication session based on the capacities of the possible paths.

\* \* \* \* \*